US010637323B2

(12) United States Patent
Haga et al.

(10) Patent No.: US 10,637,323 B2
(45) Date of Patent: Apr. 28, 2020

(54) MOTOR

(71) Applicant: Nidec Corporation, Kyoto (JP)

(72) Inventors: Hidehiro Haga, Kyoto (JP); Ryusuke Sato, Kyoto (JP); Yosuke Yamada, Kyoto (JP); Yasuaki Nakahara, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 16/245,482

(22) Filed: Jan. 11, 2019

(65) Prior Publication Data

US 2019/0149014 A1    May 16, 2019

Related U.S. Application Data

(63) Continuation of application No. 15/472,324, filed on Mar. 29, 2017, now Pat. No. 10,243,426, which is a (Continued)

(30) Foreign Application Priority Data

Sep. 30, 2014 (JP) .................................. 2014-201411
May 29, 2015 (JP) .................................. 2015-109638

(51) Int. Cl.
*H02K 5/22* (2006.01)
*H02K 3/28* (2006.01)
(Continued)

(52) U.S. Cl.
CPC .............. *H02K 5/225* (2013.01); *H02K 3/28* (2013.01); *H02K 3/50* (2013.01); *H02K 3/522* (2013.01);
(Continued)

(58) Field of Classification Search
CPC ........ H02K 11/30; H02K 1/146; H02K 29/08; H02K 3/28; H02K 3/50; H02K 3/522; H02K 5/225; H02K 7/083
(Continued)

(56) References Cited

U.S. PATENT DOCUMENTS 6,931,957 B2 * 8/2005 Saito ...................... F16H 59/70
74/335
7,215,115 B2 * 5/2007 Saito ...................... F16H 59/70
324/207.21
(Continued)

FOREIGN PATENT DOCUMENTS

JP    2004248492 A * 9/2004 .............. F16C 19/06
JP    2007006592 A * 1/2007
(Continued)

OTHER PUBLICATIONS

Haga et al., "Motor", U.S. Appl. No. 15/472,324, filed Mar. 29, 2017.

*Primary Examiner* — Alex W Mok
(74) *Attorney, Agent, or Firm* — Keating & Bennett

(57) ABSTRACT

A motor includes a bus bar assembly including a bus bar, a wiring member, and a bus bar holder. The bus bar holder includes a main body portion, a bottom portion, and a first circuit board support portion. The wiring member includes a circuit board connection terminal electrically connected to the circuit board. The circuit board connection terminal includes a contact portion connected to the circuit board, and applies force to the circuit board through the contact portion. The first circuit board support portion is disposed at a region of the bottom portion to define a side at which the circuit board connection terminal is located when viewed from one direction. The first circuit board support portion and the
(Continued)

contact portion are located at different positions when viewed from the one direction.

12 Claims, 9 Drawing Sheets

Related U.S. Application Data continuation of application No. PCT/JP2015/076569, filed on Sep. 17, 2015.

(51) Int. Cl.
- *H02K 3/52* (2006.01)
- *H02K 29/08* (2006.01)
- *H02K 11/30* (2016.01)
- *H02K 3/50* (2006.01)
- H02K 1/14 (2006.01)
- H02K 7/08 (2006.01)

(52) U.S. Cl.
CPC ............ *H02K 11/30* (2016.01); *H02K 29/08* (2013.01); *H02K 1/146* (2013.01); *H02K 7/083* (2013.01)

(58) Field of Classification Search
USPC .......................................... 310/71
See application file for complete search history.

(56) References Cited

U.S. PATENT DOCUMENTS

| | | | | |
|---|---|---|---|---|
| 7,427,860 B2* | 9/2008 | Saito | ............... | F16H 59/70 324/207.21 |
| 7,588,444 B2* | 9/2009 | Kataoka | ............... | H02K 3/50 439/76.2 |
| 7,990,001 B2* | 8/2011 | Hatano | ............... | H02K 5/225 310/71 |
| 8,390,158 B2* | 3/2013 | Nakamura | ............. | H02K 5/225 310/68 B |
| 8,729,754 B2* | 5/2014 | Fujii | ................... | H02K 3/522 310/68 B |
| 8,963,388 B2* | 2/2015 | Miyachi | ............... | B62D 5/0406 310/71 |
| 9,045,156 B2* | 6/2015 | Omae | ................ | B62D 5/0406 |
| 9,509,196 B2* | 11/2016 | Yongzuo | ............ | H02K 11/0094 |
| 2006/0068617 A1* | 3/2006 | Migita | ................ | H02K 3/522 439/76.2 |
| 2012/0098391 A1* | 4/2012 | Yamasaki | ............ | B62D 5/0406 310/68 D |
| 2013/0301229 A1* | 11/2013 | Yanagi | ................ | H05K 1/14 361/752 |
| 2014/0239755 A1* | 8/2014 | Nagao | ................ | H02K 5/20 310/54 |
| 2014/0239758 A1* | 8/2014 | Nagao | ................ | H02K 5/225 310/71 |
| 2014/0265749 A1* | 9/2014 | Motoda | ............... | H02K 5/225 310/68 R |
| 2015/0357886 A1* | 12/2015 | Ishizeki | ............... | H02K 11/04 310/71 |
| 2017/0201148 A1* | 7/2017 | Haga | .................. | H02K 3/28 |

FOREIGN PATENT DOCUMENTS

| | | | | |
|---|---|---|---|---|
| JP | 2007185055 A | * | 7/2007 | |
| JP | 2007221976 A | * | 8/2007 | ............ H02K 29/08 |
| JP | 2007221977 A | * | 8/2007 | |
| JP | 2010161863 A | * | 7/2010 | ............ H02K 5/10 |
| JP | 2010172086 A | * | 8/2010 | |
| JP | 4552254 B2 | * | 9/2010 | |
| JP | 4794667 B2 | * | 10/2011 | ............ H02K 5/225 |
| JP | 2013153633 A | * | 8/2013 | |
| JP | 2013247761 A | * | 12/2013 | |
| JP | 5386072 B2 | * | 1/2014 | |
| JP | 2014033541 A | * | 2/2014 | ............ H02K 11/33 |
| JP | 2014033557 A | * | 2/2014 | ............ H02K 5/10 |
| JP | 2014138453 A | * | 7/2014 | |
| JP | 2014143897 A | * | 8/2014 | |

\* cited by examiner

MOTOR

CROSS REFERENCE TO RELATED APPLICATIONS

This application claims the benefit of priority to Japanese Patent Application No. 2014-201411 filed on Sep. 30, 2014 and Japanese Patent Application No. 2015-109638 filed of May 29, 2015 and is a Continuation Application of PCT Application No. PCT/JP2015/076569 filed on Sep. 17, 2015. The entire contents of each application are hereby incorporated herein by reference.

BACKGROUND OF THE INVENTION

1. Field of the Invention

The present invention relates to a motor.

2. Description of the Related Art

In a conventional motor, a circuit board connection terminal is fixed to a circuit board of the motor by, for example, soldering.

In this case, the circuit board of the conventional motor may be fixed to a circuit body at a position spaced apart from a fixing portion fixed to an intermediate conductor. Therefore, when an impact is applied to the motor, the position of the circuit board at the fixing portion may be greatly changed. Therefore, the fixing portion may be damaged and connection between the circuit board and the intermediate conductor may become unstable.

SUMMARY OF THE INVENTION

A motor according to a preferred embodiment of the present invention includes a rotor including a shaft which includes a center on a center axis extending in one direction; a stator enclosing the rotor and rotating the rotor about the center axis; a cylindrical housing holding the stator a bus bar assembly; a circuit board allowing a surface of the second side to cross the one direction, wherein the bus bar assembly includes a wiring member electrically connected to the circuit board; and a bus bar holder holding the wiring member, the bus bar holder includes a cylindrical main body portion, a connector portion protruding from the main body portion toward a radially outer side of the center axis, and a bottom portion widening from an inner surface of the main body portion toward the radially inner side, and a first circuit board support portion extending axially from the bottom portion and supporting the circuit board axially; and the wiring member includes a circuit board connection terminal electrically connected to the circuit board, the circuit board connection terminal includes a contact portion connected to the circuit board, the first circuit board support portion is disposed at a region of the bottom portion to define a side at which the circuit board connection terminal is located on the basis of the center axis when viewed from the one direction, and the first circuit board support portion and the contact portion are disposed at different positions when viewed from the one direction.

The above and other elements, features, steps, characteristics and advantages will become more apparent from the following detailed description of the preferred embodiments with reference to the attached drawings.

DETAILED DESCRIPTION OF THE PREFERRED EMBODIMENTS

Motors according to preferred embodiments of the present invention will hereinafter be described with reference to the attached drawings. Further, the scope of the present invention is not limited to the following preferred embodiments, but may be arbitrarily changed within the technical spirit of the present invention. To easily understand each component in the following drawings, an actual structures, and a scale of each structure, the number of structures, etc., may be different.

Figure 1:
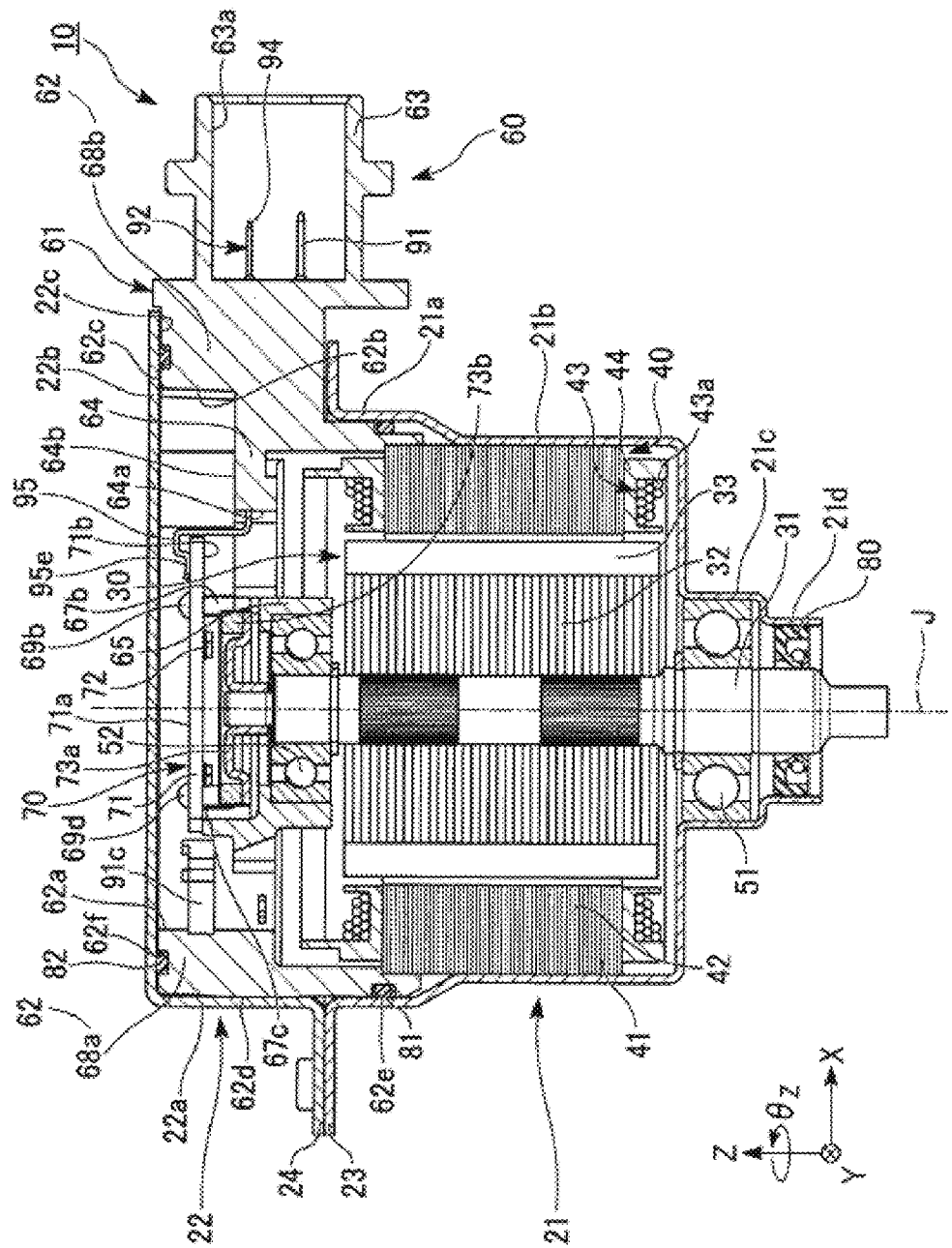
FIG. 1 is a cross-sectional view illustrating a motor according to a preferred embodiment of the present invention.

In the drawings, an X-Y-Z coordinate system is provided as an appropriate three-dimensional (3D) orthogonal coordinate system. In the X-Y-Z coordinate system, a direction parallel to the axial direction (one direction) of a center axis J shown in FIG. 1 will hereinafter be referred to as a Z-axis direction. A direction parallel to a longitudinal direction of a bus bar assembly 60 shown in FIG. 1, that is, the left-and-right direction of FIG. 1, is referred to as an X-axis direction. A direction parallel to a width direction of the bus bar assembly 60, that is, a direction perpendicular to both the X-axis direction and the Z-axis direction, is referred to as a Y-axis direction.

In the following description, a positive side of the Z-axis direction (+Z side, a second side) will hereinafter be defined as a "rear side" and a negative side of the Z-axis direction (−Z side, a first side) will hereinafter be defined as a "front side." It is to be understood that the descriptions of the rear side and the front side are used for explanation only, and they do not limit location relation or direction of the actual motor, members, and the like. Unless otherwise explained, a direction parallel to the center axis J (Z-axis direction) is simply referred to as an "axial direction," a radial direction having its center on the center axis J is simply referred to as a "radial direction," and a circumferential direction having its center on the center axis J, that is, the axial circumference of center axis J (θZ direction), is simply referred to as a "circumferential direction."

Further, herein, descriptions such as being axially extended do not only refer to a case of strictly being extended in the axial direction (Z-axis direction), but it may also include the other case of being extended in a direction inclined at less than about 45° relative to the axial direction, for example. Also, descriptions such as being radially extended do not only refer to a case of strictly being extended in the radial direction, that is, the direction perpendicular to the axial direction (Z-axis direction), but it may also include a case of being extended in a direction inclined at less than about 45° relative to the radial direction, for example.

Figure 2:
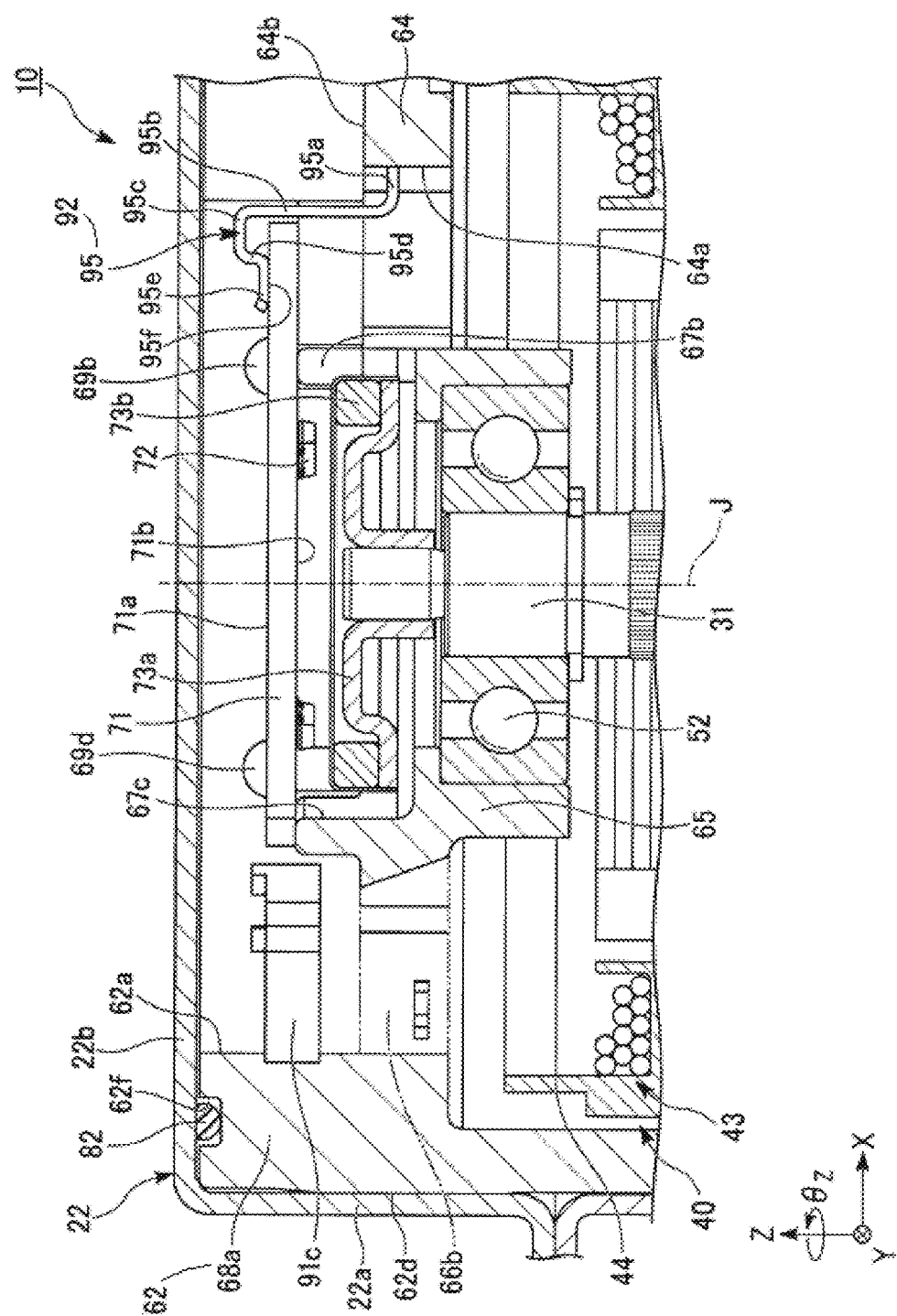
FIG. 2 is a partially enlarged cross-sectional view illustrating the motor according to a preferred embodiment of the present invention.
Figure 3:
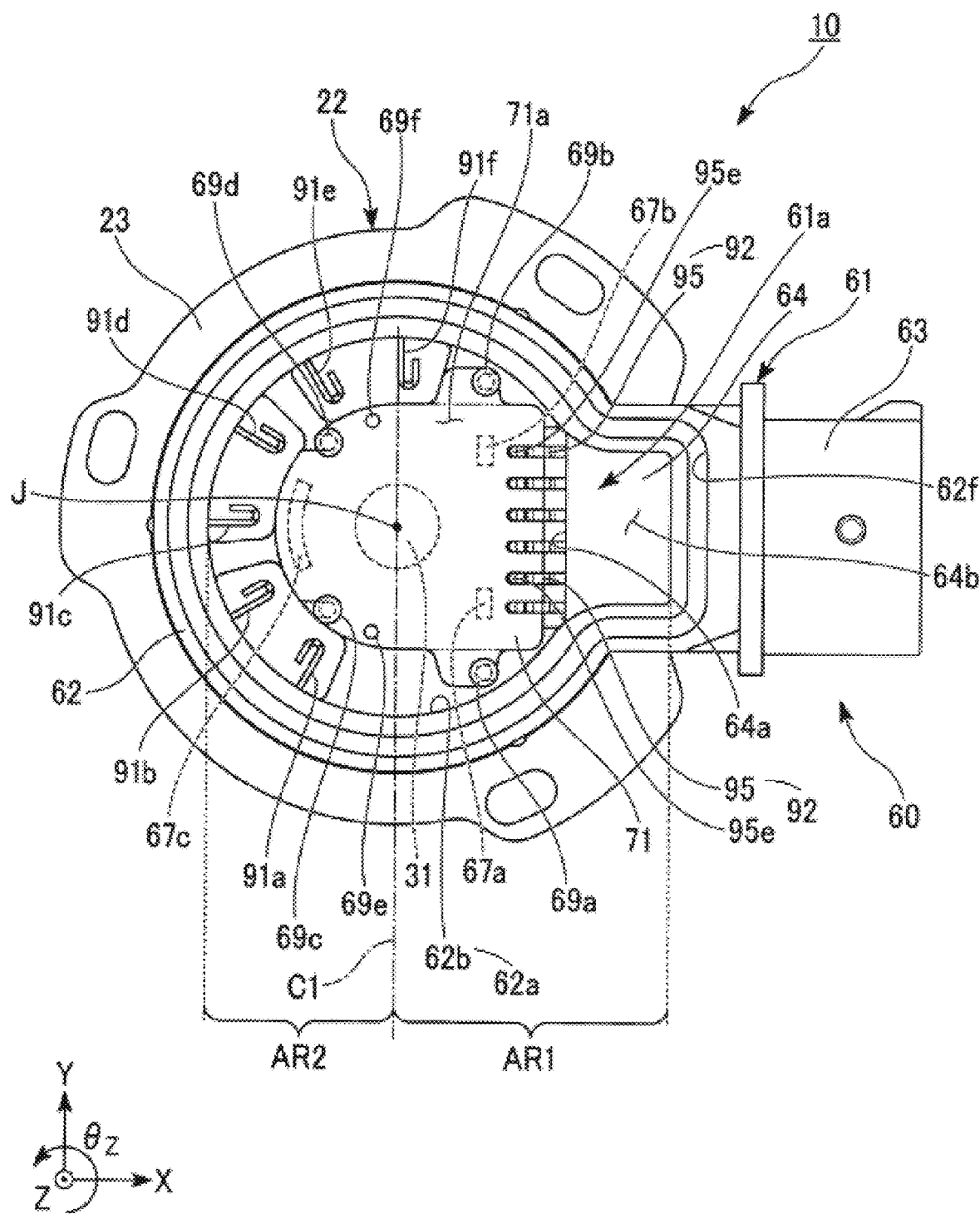
FIG. 3 is a plan view illustrating the motor according to a preferred embodiment of the present invention.

FIG. 1 is a cross-sectional view illustrating a motor 10 according to a preferred embodiment of the present invention. FIG. 2 is a cross-sectional view illustrating a portion of the motor 10, and is a partially enlarged view of the motor shown in FIG. 1. FIG. 3 is a plan view (XY plan view) illustrating some parts of the motor 10. A cover 22 is omitted from FIG. 3.

The motor 10 according to the present preferred embodiment is a brushless motor. As illustrated in FIG. 1, the motor 10 includes a housing 21, a cover 22, a rotor 30 including a shaft 31, a stator 40, a first bearing 51, a second bearing 52, a controller 70, a bus bar assembly 60, and a plurality of O-rings. The plurality of O-rings preferably includes a front side O-ring 81 and a rear side O-ring 82.

The rotor 30, the stator 40, the first bearing 51, and the oil seal 80 are accommodated into the housing 21. The housing 21 is opened toward the rear side (+Z side). An end of the front side (−Z side) of the bus bar assembly 60 is inserted into the opening of the housing 21. The bus bar assembly 60 holds the second bearing 52. The first bearing 51 and the second bearing 52 support both sides of the axial direction (Z-axis direction) of the shaft 31.

The cover 22 covers at least a portion of the rear side (+Z side) of the bus bar assembly 60. The cover 22 is fixed to the housing 21. The cover 22 preferably includes a cylindrical portion 22a, a cover portion 22b, a front surface 22c of the cover, and a rear side flange portion 24. The controller 70 is located between the second bearing 52 and the cover 22. The front side O-ring 81 is located between the bus bar assembly 60 and the housing 21. The rear side O-ring 81 is located between the bus bar assembly and the cover 22. The above-mentioned components will hereinafter be described in greater detail below.

The housing 21 is preferably a cylindrical or substantially cylindrical member, and holds the stator 40 and the first bearing 51. In a preferred embodiment of the present invention, the housing 21 preferably has a multi-stepped cylindrical shape or a substantially multi-stepped shape with open ends on both sides. In this preferred embodiment, a material of the housing 21 is, for example, metal. In more detail, it is preferred that a material of the housing 21 is, for example, aluminum, iron alloy, or the like.

The housing 21 preferably includes a front side flange portion 23, a bus bar assembly insertion portion 21a, a stator holding portion 21b, a front bearing holding portion 21c, and an oil seal holding portion 21d. The front side flange portion 23, the bus bar assembly insertion portion 21a, the stator holding portion 21b, the front bearing holding portion 21c, and the oil seal holding portion 21d are disposed in a direction from the rear side (+Z side) to a front side (−Z side) along the axial direction (Z-axis direction). That is, in the housing 21, the front side flange portion 23 is preferably disposed at a rearmost side and the oil seal holding portion 21d is preferably disposed at a frontmost side. Each of the bus bar assembly insertion portion 21a, the stator holding portion 21b, the front bearing holding portion 21c, and the oil seal holding portion 21d has a concentric cylindrical or substantially cylindrical shape. A diameter of the above members are reduced in the order of the bus bar assembly insertion portion 21a, the stator holding portion 21b, the front bearing holding portion 21c, and the oil seal holding portion 21d.

The front side flange portion 23 extends from the end of the rear side (+Z side) of the bus bar assembly insertion portion 21a toward a radially outer side. That is, the housing 21 includes a housing flange portion 23 at the end of the rear side. The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed in the bus bar assembly insertion portion 21a. That is, the end of the front side of the bus bar assembly 60 is disposed in the housing 21.

An outer surface of a stator 40 (preferably an outer surface of a core back portion 41, to be described later) is fitted into an inner surface of the stator holding portion 21b. Accordingly, the stator 40 is fixed to the housing 21. The front bearing holding portion 21c holds the first bearing 51. In this preferred embodiment, the inner surface of the front bearing holding portion 21c preferably is fitted into the outer surface of the first bearing 51. The oil seal 80 is held in the oil seat holding portion 21d.

The rotor 30 preferably includes a shaft 31, a rotor core 32, and a rotor magnet 33. The shaft 31 has its center on the center axis J which extends in one direction (Z-axis direction). According to this exemplary preferred embodiment, the shaft 31 is a cylindrical or substantially cylindrical member. Further, the shaft 31 may be a solid member or as a hollow cylindrical member. The shaft 31 is rotatably supported around the axis (in ±θZ direction) by the first bearing 51 and the second bearing 52. The end of the front side (−Z side) of the shaft 31 protrudes to the outside of the housing 21. In the oil seal holding portion 21d, the oil seal 80 is disposed around the axis of the shaft 31.

The rotor core 32 is preferably a cylindrical or substantially cylindrical member. The rotor core 32 is fixed to the shaft 31 while enclosing the shaft 31 around the axis (in the θZ direction). In more detail, the rotor core 32 preferably includes a through-hole which penetrates axially through the rotor core 32. At least a portion of the shaft 31 is disposed within the through-hole of the rotor core 32. The shaft 31 is fixed to the rotor core 32 by, for example, press-fitting, adhesion, or the like. The rotor magnet 33 is fixed to an outer surface along an axis circumference of the rotor core 32. In more detail, according to this exemplary preferred embodiment, the rotor magnet 33 preferably has an annular or substantially annular shape. The outer surface of the rotor core 32 faces the inner surface of the rotor magnet 33. The rotor magnet 33 is fixed to the rotor core 32 by, for example, an adhesive, or the like. Further, the shape of the rotor magnet 33 is not necessarily annular. The rotor magnet 33 may be defined by a plurality of magnets arranged on an outer circumferential surface of the rotor core 32 in a circumferential direction. The rotor core 32 and the rotor magnet 33 rotates integrally with the shaft 31.

The stator 40 preferably has a cylindrical or substantially cylindrical shape. The rotor 30 is located in the stator 40. In other words, the stator 40 encloses the rotor 30 around the axis (in the θZ direction). The rotor 30 may relatively rotate around the center axis J with respect to the stator 40. The stator 40 preferably includes a core back portion 41, a plurality of teeth portions 42, a plurality of coils 43, and a plurality of bobbins 44. According to this exemplary preferred embodiment, the core back portion 41 and the teeth portion 42 is a stacked steel plate in which a plurality of electromagnetic steel plates are stacked.

The core back portion 41 may have a cylindrical or substantially cylindrical shape. Preferably, the shape of the core back portion 41 is concentric with the shaft 31. The plurality of teeth portions 42 are disposed on an inner surface of the core back portion 41. Each teeth portion 42 extends from the inner surface of the core back portion 41 toward a radially inner side (that is, toward the shaft 31). Preferably, the teeth portions 42 are arranged at equal or substantially equal intervals in the inner surface of the core back portion 41 in the circumferential direction.

Preferably, the bobbin 44 is a cylindrical or substantially cylindrical member. Each bobbin 44 is respectively mounted on one of the teeth portions 42. Preferably, the bobbin is defined by at least two members engaged from an axial direction. Each coil 43 is disposed in each bobbin 44. Each coil 43 is provided preferably by winding a conductive wire 43a about a bobbin 44. Further, as the conductive wire 43a, a circular wire or a flat wire is preferably used.

The first bearing 51 is disposed at a front side (−Z side) of the stator 40. The first bearing 51 is held by the front bearing holding portion 21c. The second bearing 52 is disposed at the rear side (+Z side) opposite to the front side (−Z side) of the stator 40. The second bearing 52 is held by a rear bearing holding portion 65 of a bus bar holder 61 which will be described later.

The first bearing 51 and the second bearing 52 support the shaft 31. According to this preferred embodiment, each of the first bearing 51 and the second bearing 52 is a ball bearing. However, the type of the first bearing 51 and the second bearing 52 is not particularly limited to the above bearing type. For example, different kinds of bearings such as a sleeve bearing and a fluid hydraulic bearing may also be used. Further, the type of bearing of the first bearing 51 may be different from that of the second bearing 52.

The oil seal 80 is preferably an annular or substantially annular member. The oil seal 80 is mounted in the oil seal holding portion 21d around the axis (in the OZ direction) of the shaft 31. In more detail, the oil seal 80 is disposed in the oil seal holding portion 21d. An end of an axial lower portion of the shaft 31 penetrates through the through-hole of the oil seal 80. The oil seal 80 is disposed between the oil seal holding portion 21d and the shaft 31. Therefore, the oil seal 80 may prevent water, oil, etc., from infiltrating from a gap between the oil seal holding portion 21d and the shaft 31 into the housing 20. The oil seal 80 is preferably made of, for example, a resin material. However, a configuration and a material of the oil seal 80 are not limited thereto, and therefore an oil seal of different kinds of configurations and materials may also be used.

The controller 70 controls driving operations of the motor 10. The controller 70 preferably includes the circuit board 71, a rotating sensor 72, a sensor magnet holding member 73a, and a sensor magnet 73b. That is, the motor 10 includes the circuit board 71, the rotation sensor 72, the sensor magnet holding member 73a, and the sensor magnet 73b.

The circuit board 71 is disposed on an extending line of the rear side (+Z side) of the shaft 31. The circuit board 71 is disposed between the second bearing 52 and the cover 22 in the axial direction (Z-axis direction). The circuit board 71 includes a circuit board rear surface 71a located at the rear side and a circuit board front surface 71b located at the front side (−Z side). The circuit board rear surface 71a and the circuit board front surface 71b define a main surface of the circuit board 71. That is, the circuit board front surface 71b and the circuit board rear surface 71a intersect with the center axis (Z-axis). In preferred embodiment, the main surface of the circuit board 71 is preferably orthogonal or substantially orthogonal to the center axis J (or Z-axis). The circuit board rear surface 71a faces the cover front surface 22c.

As illustrated in FIG. 3, the circuit board 71 is supported, from the front side (−Z side), by the first circuit board support portions 67a and 67b and the second circuit board support portion 67c (described later). A printed wiring (not shown) is preferably disposed in at least one side of the main surface of the circuit board 71. A circuit board connection terminal 95 (described later) is connected to the circuit board rear surface 71a. The circuit board 71 outputs, for example, a motor driving signal, etc.

As illustrated in FIG. 2, the sensor magnet holding member 73a is an annular or substantially annular member. A hole at a center of the sensor magnet holding member 73a is fitted with a small diameter of the end of the rear side (+Z side) of the shaft 31. Accordingly, the position of the sensor magnet holding member 73a is determined on the basis of the shaft 31. Preferably, the sensor magnet holding member 73a is fixed to the shaft 31 by press-fitting, adhesion, etc. The sensor magnet holding member 73a may rotate along with the shaft 31.

The sensor magnet 73b preferably has an annular or substantially annular shape. An N pole and an S pole of the sensor magnet 73b are alternately disposed in the circumferential direction. The sensor magnet 73b is fitted on an outer circumferential surface of the sensor magnet holding member 73a. In more detail, at least a portion of the sensor magnet 73b comes in contact with the outer circumferential surface of the sensor magnet holding member 73a. Therefore, the sensor magnet 73b is fixed to the sensor magnet holding member 73a. As a result, the sensor magnet 73b is disposed at the circumference (±θZ direction) of the shaft 31 at the rear side (+Z side) of the second bearing 52 such that the sensor magnet 73b is able to rotate along with the shaft 31.

At least one rotation sensor 72 is preferably mounted on the front surface 71b of the circuit board. The rotation sensor faces the sensor magnet 73b in the axial direction (Z-axis direction). The rotation sensor 72 detects the position of the rotor depending on a change in magnetic flux of the sensor magnet 73b. Although not illustrated, according to the preferred embodiment, three rotation sensors 72 are preferably disposed on, for example, the front surface 71b of the circuit board. Further, as the rotation sensor 72, for example, a hall device, etc., is used.

Figure 4:
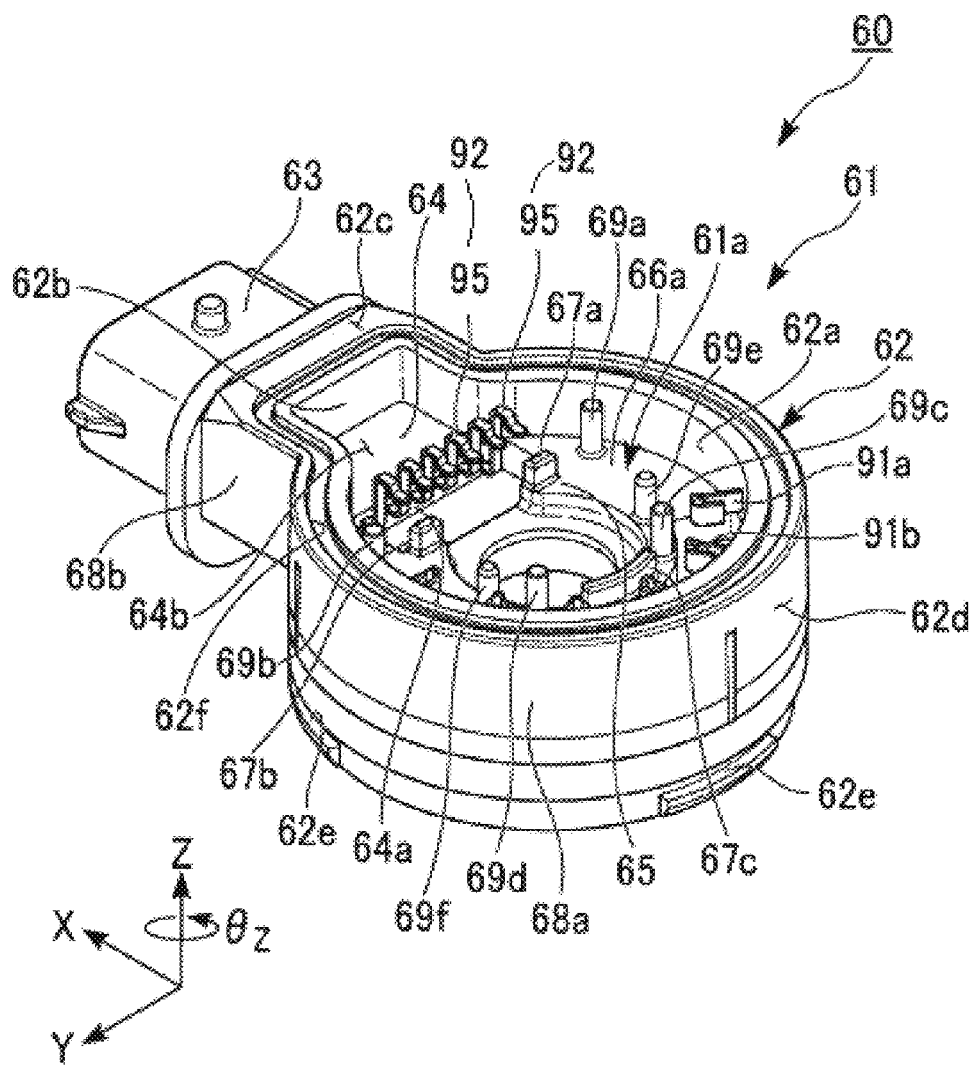
FIG. 4 is a perspective view illustrating a bus bar assembly according to a preferred embodiment of the present invention.
Figure 5:
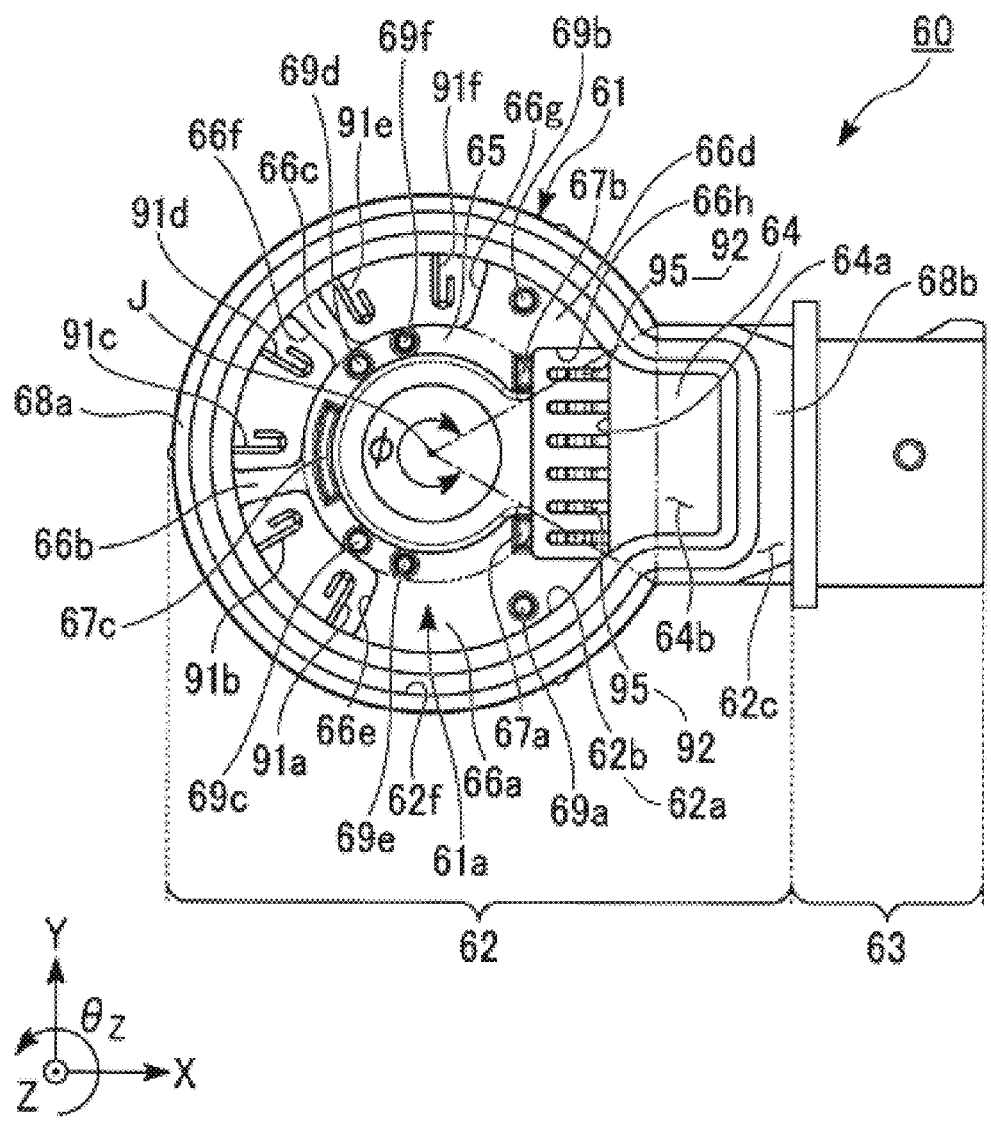
FIG. 5 is a plan view illustrating the bus bar assembly according to a preferred embodiment of the present invention.

FIGS. 4 and 5 are views illustrating the bus bar assembly 60. FIG. 4 is a perspective view. FIG. 5 is a plan view. The bus bar assembly 60 supplies a driving current from the external power source to the stator 40. As illustrated in FIGS. 1 to 5, the bus bar assembly 60 preferably includes a bus bar holder 61, at least one bus bar 91, and a wiring member 92. In addition, in preferred embodiment, the bus bar assembly 60 includes a plurality of bus bars 91.

The bus bar holder 61 is preferably defined by a holder made of resin. Preferably, a material of the bus bar holder is an electrically insulating resin. The bus bar holder 61 holds the bus bar 91 and the wiring member 92. As illustrated in FIG. 1, a rear side (+Z side) of the bus bar holder 61 is accommodated in the cylindrical portion 22a. In this preferred embodiment, the bus bar holder 61 is press-fitted into the cylindrical portion 22a. At least a portion of a front side (−Z side) of the bus bar holder 61 is accommodated in the bus bar assembly insertion portion 21a of the housing 21.

As long as a material making the bus bar holder 61 has an insulation property, any material may be used without being specially limited. The bus bar holder 61 preferably is manufactured as a single monolithic member by, for example, injection molding. As illustrated in FIGS. 4 and 5, the bus bar holder 61 includes a main body portion 62, a connector portion 63, a connection terminal holding portion 64, a rear bearing holding portion 65, and connection portions 66a, 66b, 66c, and 66d.

As illustrated in FIGS. 1 and 4, the main body portion 62 preferably has a cylindrical or substantially cylindrical shape enclosing the center axis J in the circumferential direction (θZ direction). The main body portion 62 includes an opening 62a at the rear side (+Z side) thereof. The main body portion 62 preferably encloses the end of the rear side of the rotor 30 and the end of the rear side of the stator 40 in the circumferential direction. That is, a portion of the rear side of the rotor 30 and the stator 40 is located in the inner side of the front side (−Z side) of the main body portion 62.

A rear surface 62c of the main body portion is preferably provided with a groove portion 62f. The groove portion 62f is provided along the contour of the main body portion 62 enclosing the opening 62a. A rear side O-ring 82 is fitted into the groove portion 62f. As illustrated in FIG. 4, the front side (−Z side) of the outer surface 62d of the main body portion 62 is provided with an O-ring holding portion 62e. As illustrated in FIG. 1, the front side O-ring 81 is fitted into the O-ring holding portion 62e.

As illustrated in FIGS. 4 and 5, the main body portion preferably includes an arc portion 68a and a connector connection portion 68b. As illustrated in FIG. 5, the shape of a cross section (XY cross-section) perpendicular to the center axis J of the arc portion 68a and the shape of a plan view (XY plan view) is an arc shape concentric with the rear bearing holding portion 65. Preferably, a central angle of the arc shape may be φ240° or higher, for example. In this preferred embodiment, the arc portion 68a is preferably press-fitted into the cylindrical portion 22a of the cover 22.

As illustrated in FIGS. 4 and 5, the connector connection portion 68b is connected to the connector portion 63. The connector connection portion 68b is connected to both ends of the arc portion 68a. The connector connection portion 68b protrudes toward the connector portion 63 (+_X side).

The connector portion 63 is a portion connected to external power supply (not shown). The connector portion 63 has a cylindrical shape. The connector portion 63 preferably has a rectangular parallelepiped or substantially rectangular parallelepiped shape. The connector portion 63 extends from a portion of the outer surface of the connector connection portion 68b to the radially outer side (+X side) of the center axis J. The connector portion 63 includes an opening at the radially outer side (+X side). That is, the connector portion 63 protrudes from the main body portion 62 toward the radially outer side of the center axis J. As illustrated in FIG. 1, the entirety of the connector portion 63 is exposed outside the cover 22.

As illustrated in FIG. 1, the connector portion 63 preferably includes an opening 63a for a power supply opened toward one side (+X side) disposed in a longitudinal direction of the bus bar holder 61. A bottom surface of the power-supply opening 63a is provided with the bus bar 91 and an external power-supply connection terminal 94 to be described later. The bus bar 91 and the external power-supply connection terminal 94 protrude from the bottom surface of the power-supply opening 63a toward one side (+X side) disposed in the longitudinal direction of the bus bar holder 61.

As illustrated in FIGS. 4 and 5, the connection terminal holding portion 64 preferably has a rectangular parallelepiped or substantially rectangular parallelepiped shape. The connection terminal holding portion 64 protrudes toward the radially inner side from the inner surface 62b of the main body portion. In more detail, as illustrated in FIG. 5, the connection terminal holding portion 64 extends from the inner surface of the connector connection portion 68b in the direction (−X direction) opposite to the direction in which the connector portion 63 extends. The holding portion rear surface 64b is located at the front side ahead of the circuit board rear surface 71a. The holding portion rear surface 64b is located at the front side ahead of the main body rear surface 62c of the rear side of the main body portion 62.

The rear bearing holding portion 65 is disposed at the radially inner side of the main body portion 62. As illustrated in FIG. 2, the rear bearing holding portion 65 holds the second bearing 52.

As illustrated in FIG. 5, the connection portions 66a, 66b, 66c, and 66d connect the main body portion 62 to the rear bearing holding portion 65 disposed in the main body portion 62. The connection portions 66a-66d are positioned at the circumference of the rear bearing holding portion 65 while being spaced apart from each other at equal or substantially equal intervals along the circumferential direction.

Gaps 66e, 66f, 66g, and 66h are provided among the connection portions 66a-66d neighboring with each other in the circumferential direction. That is, gaps 66e, 66f, 66g, and 66h are provided between the rear bearing holding portion 65 and the main body portion 62. The gap 66e is defined by the connection portion 66a, the connection portion 66b, the main body portion 62, and the rear bearing holding portion 65. The gap 66f is defined by the connection portion 66b, the connection portion 66c, the main body portion 62, and the rear bearing holding portion 65. The gap 66g is defined by the connection portion 66c, the connection portion 66d, the main body portion 62, and the rear bearing holding portion 65. The gap 66h is defined by the connection portion 66d, the rear bearing holding portion 65, the connection portion 66a, the connection terminal holding portion 64, and the main body portion 62.

In a plan view, the position of the gap 66e is a position including coil connection portions 91a and 91b to be described later. In a plan view, the position of the gap 66f is a position including coil connection portions 91c and 91d to be described later. In a plan view, the position of the gap 66g is a position including coil connection portions 91e and 91f to be described later. In a plan view, the position of the gap 66h is a position including a circuit board connection terminal 95 to be described later. In a plan view, the appearance of the gap 66h is a rectangular or substantially rectangular shape.

As illustrated in FIGS. 4 and 5, the bottom portion 61a preferably includes a connection terminal holding portion 64, a rear bearing holding portion 65, and connection portions 66a-66d. That is, the bus bar holder 61 includes the bottom portion 61a. The bottom portion 61a extends from the main body inner surface 62b toward the radially inner side.

As illustrated in FIG. 3, the bottom portion 61a is preferably divided into two regions by a division line C1. The division line C1 is perpendicular or substantially perpendicular to the protrusion direction (X-axis direction) and the axial direction (Z-axis direction) of the connector portion 63, and crosses the center axis J. Further, in the following description, the direction parallel or substantially parallel to the direction of the division line C1 will hereinafter be referred to as a division-line direction (Y-axis direction).

In the bottom portion 61a, a region of a specific side (+X side) in which the circuit board connection terminal 95 of the division line C1 is provided when viewed from the plan view (XY plan view) will hereinafter be referred to as a first region AR1. That is, in the bottom portion 61a, the first region AR1 is a region of the side (+X side) in which the circuit board connection terminal 95 is provided on the basis of the center axis J when viewed from the axial direction (Z-axis direction).

In the bottom portion 61a, a region of the other side (−X side) opposite to the above side at which the circuit board connection terminal 95 of the division line C1 is provided when viewed from the plan view (XY plan view) will hereinafter be referred to as a second region AR2. That is, in the bottom portion 61a, the second region AR2 is a region of the side (−X side) opposite to the above side at which the circuit board connection terminal 95 is provided on the basis of the center axis J when viewed from the axial direction (Z-axis direction).

First circuit board support portions 67a and 67b, a second circuit board support portion 67c, first protrusion portions 69a and 69b, second protrusion portions 69c and 69d, and bus bar holder convex portions 69e and 69f are preferably disposed at the surface of the rear side (+Z side) of the bottom portion 61a. That is, the bus bar holder 61 includes the first circuit board support portions 67a and 67b, the second circuit board support portion 67c, the two first protrusion portions 69a and 69b, the second protrusion portions 69c and 69d, and the bus bar holder convex portions 69e and 69f. Further, in the following description, the second protrusion portions 69c and 69d may also be referred to as third circuit board support portions 69c and 69d.

As illustrated in FIG. 4, the first circuit board support portions 67a and 67b extend from the bottom portion 61a toward the rear side (+Z side). As illustrated in FIG. 2, the first circuit board support portion 67b supports the circuit board 71 from the front side (−Z side). That is, the end of the rear side of the first circuit board support portion 67b contacts the circuit board front surface 71b. The end of the rear side of the first circuit board support portion 67b is also able to be applied to the first circuit board support portion 67a.

As illustrated in FIG. 3, the first circuit board support portions 67a and 67b is disposed in the first region AR1. The first circuit board support portions 67a and 67b and a contact portion 95e to be described later are arranged at different positions when viewed from the axial direction (Z-axis direction). In the present preferred embodiment, the first circuit board support portions 67a and 67b are disposed between the shaft 31 and the contact portion 95e in the radial direction.

As illustrated in FIG. 5, in the present preferred embodiment, the first circuit board support portions 67a and 67b are preferably disposed at the surface of the rear side (+Z side) of the rear bearing holding portion 65 from among elements of the bottom portion 61a. The first circuit board support portions 67a and 67b are disposed at the edge of the center axis J (−X side) of a gap 66h.

As illustrated in FIG. 3, the first circuit board support portion 67a and the first circuit board support portion 67b are preferably arranged along the division-line direction (Y-axis direction). In the division-line direction, the first circuit board support portion 67a is arranged at the same position as the end of the +Y side of the connection terminal holding portion 64. In the division-line direction, the first circuit board support portion 67b is provided at the same position as the end of the −Y side of the connection terminal holding portion 64.

A portion of the first circuit board support portion 67a is preferably disposed at one side (+Y side) of the plurality of contact portions 95e in the division-line direction (Y-axis direction), i.e., in the arrangement direction (the predetermined direction) of the contact portion 95e of the circuit board connection terminal 95, to be described later. A portion of the first circuit board support portion 67b is preferably disposed at the other side (−Y side) of the plurality of contact portions 95e in the division-line direction.

In FIG. 3, the plan view shape of the first circuit board support portions 67a and 67b preferably is a rectangular or substantially rectangular shape, for example. The plan view (XY plan view) shape of the first circuit board support portions 67a and 67b is not limited to the above shapes. The plan view (XY plan view) shape of the first circuit board support portions 67a and 67b may be, for example, a circular or substantially circular shape, a rectangular or substantially rectangular shape, and a polygonal shape. The first circuit board support portions 67a and 67b extend along the division-line direction (Y-axis direction). That is, the first circuit board support portions 67a and 67b extend along the arrangement direction (the predetermined direction) of the contact portion 95e of the circuit board connection terminal 95 to be described later.

As illustrated in FIG. 4, the second circuit board support portion 67c extends from the bottom portion 61a to the rear side (+Z side). As illustrated in FIG. 2, the second circuit board support portion 67c preferably supports the circuit board 71 from the front side (−Z side). That is, the end of the rear side of the second circuit board support portion 67c contacts the circuit board front surface 71b.

As illustrated in FIG. 3, the second circuit board support portion 67c is located in the second region AR2. As illustrated in FIG. 5, the second circuit board support portion 67c is located at the surface of the rear side (+Z side) of the rear bearing support portion 65 from among elements of the bottom portion 61a. In FIG. 3, the plan view shape of the second circuit board support portion 67c is preferably a shape that extends in the circumferential direction. The plan view (XY plan view) shape of the second circuit board support portion 67c is not limited to the above-mentioned shape in the same manner as in the first circuit board support portions 67a and 67b. The second circuit board support portion 67c is preferably located at the same position as the center portion of the connection terminal holding portion 64 in the division-line direction (Y-axis direction).

As illustrated in FIG. 4, the first protrusion portions 69a and 69b extend from the bottom portion 61a to the rear side (+Z side). As illustrated in FIG. 3, the first protrusion portions 69a and 69b are provided along the division-line direction (Y-axis direction). The first protrusion portions 69a and 69b are preferably located in the first region AR1. As illustrated in FIG. 5, the first protrusion portion 69a is located at the connection portion 66a from among elements of the bottom portion 61a. In the present preferred embodiment, the first protrusion portion 69b is located at the connection portion 66d from among elements of the bottom portion 61a.

The radial distance between the first protrusion portion 69a and the center axis J is longer than the radial distance between the end of the radially inner side of the coil connection portions 91a-91f (described later) and the center axis J. That is, the first protrusion portion 69a is preferably located at the radially outer side ahead of the end of the radially inner side of the coil connection portions 91a-91f. When viewed from the axial direction (Z-axis direction), the first protrusion portion 69a preferably overlaps with at least a portion of the coil connection portions 91a-91f in the circumferential direction. The above-mentioned description may also be equally applied to the first protrusion portion 69b. As illustrated in FIG. 3, the first protrusion portions 69a and 69b are inserted into a notch provided to the circuit board 71.

As illustrated in FIG. 2, the end of the rear side (+Z side) of the first protrusion portion 69b is disposed at the rear side ahead of the circuit board 71. In the first protrusion portion 69b, a portion protruding toward the rear side ahead of the circuit board rear surface 71a is made molten by heat such that the protruding portion is deposited on the circuit board rear surface 71a. For example, the deposited portion of the first protrusion portion 69b preferably has a hemispheric or substantially hemispheric shape. The above-mentioned description is also equally applied to the first protrusion portion 69a. Therefore, the first protrusion portions 69a and 69b are fixed to the circuit board 71. As a result, the first protrusion portions 69a and 69b support the circuit board 71 from the rear side.

As illustrated in FIG. 4, the second protrusion portions 69c and 69d extend from the bottom portion 61a toward the rear side (+Z side). As illustrated in FIG. 3, the second protrusion portions 69c and 69d are provided along the division-line direction (Y-axis direction). The second protrusion portions 69c and 69d are preferably located in the second region AR2. As illustrated in FIG. 5, the second protrusion portions 69c and 69d are preferably located in the rear bearing holding portion 65 from among elements of the bottom portion 61a. As illustrated in FIG. 3, the second protrusion portions 69c and 69d are inserted into the notch provided to the circuit board 71.

As illustrated in FIG. 2, the end of the rear side (+Z side) of the second protrusion portion 69d is preferably located at the rear side ahead of the circuit board 71. In the second protrusion portion 69d, a portion protruding toward the rear side ahead of the circuit board rear surface 71a is made molten by heat such that the protruding portion is deposited on the circuit board rear surface 71a. That is, the second protrusion portion 69d is deposited on the circuit board rear surface 71a. For example, the deposited portion of the second protrusion portion 69d preferably has a hemispheric or substantially hemispheric shape. The above-mentioned description is also equally applied to the second protrusion portion 69c. Therefore, the second protrusion portions 69c and 69d are fixed to the circuit board 71. As a result, the second protrusion portions 69c and 69d support the circuit board 71 from the rear side.

As illustrated in FIG. 4, the bus bar holder convex portions 69e and 69f extend from the bottom portion 61a to the rear side (+Z side). As illustrated in FIG. 3, the bus bar holder convex portions 69e and 69f are provided along the division-line direction. In the present preferred embodiment, the bus bar holder convex portions 69e and 69f are preferably located in the second region AR2. The end of the rear side of the bus bar holder convex portions 69e and 69f is inserted into a hole portion provided to the circuit board 71.

The bus bar 91 is a thin plate-shaped member made of an electrically conductive material (for example, metal, etc.). The bus bar 91 is directly or indirectly electrically connected to the stator 40. The driving current is supplied from external power supply or the like to the stator 40 through the bus bar 91. Although not shown in the drawings, according to this preferred embodiment, the plurality of bus bars 91 is mounted to the stator 40. For example, if the motor is a three-phase motor, at least three bus bars 91 are mounted to the stator 40. In addition, according to a difference in coil wiring methods, the number of bus bars 91 may be changed to, for example, 4 or higher. Each bus bar 91 is disposed in the bus bar holder 61. One end of the bus bar 91 is exposed outside the cover 22. For example, the external power supply is connected to one end of the bus bar 91 exposed outside the cover 22.

As illustrated in FIG. 5, the plurality of bus bars 91 include coil connection portions 91a, 91b, 91c, 91d, 91e, and 91f. The coil connection portions 91a-91f are disposed at the other end of the plurality of bus bars 91. The coil connection portions 91a-91f preferably protrude from the inner surface 62b of the main body portion. In more detail, the coil connection portions 91a-91f protrude from the inner surface of the arc portion 68a of the inner surface 62b of the main body portion toward the radially inner side. The coil connection portion 91c shown in FIG. 2 is electrically connected to the coil 43 through a connection member (not shown). Therefore, the bus bar 91 is electrically connected to the stator 40. In the above description, the coil connection portions 91a, 91b, 91d-91f are preferably identical in structure to the coil connection portion 91c.

The wiring member 92 is fixed to the bus bar holder 61. A portion of the wiring member 92 is preferably embedded in the bus bar holder 61. The wiring member 92 electrically connects the external power supply (not shown) to the circuit board 71. In the present preferred embodiment, several wiring members 92 are provided. In other words, the bus bar assembly 60 preferably includes a plurality of wiring members 92. The wiring member 92 includes the external power-supply connection terminal 94 and the circuit board connection terminal 95. The external power-supply connection terminal 94 and the circuit board connection terminal 95 are exposed from the bus bar holder 61.

The external power-supply connection terminal 94 is provided in the connector portion 63. The external power-supply connection terminal 94 protrudes from the bottom surface of the power-supply opening 63a. The external power-supply connection terminal 94 is electrically connected to the external power supply (not shown).

As illustrated in FIG. 2, the circuit board connection terminal 95 protrudes from the holding portion inner surface 64a. The circuit board connection terminal 95 preferably includes a first connection portion 95a, a first extension portion 95b, a second connection portion 95c, a second extension portion 95d, and a contact portion 95e.

The first connection portion 95a protrudes from the holding portion inner surface 64a toward the radially inner side. That is, the first connection portion 95a extends from the connection terminal holding portion 64 toward the radially inner side. The first connection portion 95a is located at the radially outer side ahead of the circuit board 71.

The first extension portion 95b extends from the first connection portion 95a toward the rear side (+Z side). In more detail, the first extension portion 95b extends from the end of the radially inner side of the first connection portion 95a toward the rear side. The first extension portion 95b extends to the rear side of the circuit board 71. That is, the end of the rear side of the first extension portion 95b is located at the rear side ahead of the circuit board rear surface 71a.

The second connection portion 95c extends from the first extension portion 95b in the radial direction. In the present preferred embodiment, the second connection portion 95c extends from the first extension portion 95b toward the radially inner side. In more detail, the second connection portion 95c extends from the end of the rear side (+Z side) of the first extension portion 95b toward the radially inner side.

The second extension portion 95d extends from the second connection portion 95c toward the axial direction (Z-axis direction). In the present preferred embodiment, the second extension portion 95d extends from the second connection portion 95c to the front side (−Z side). In more detail, the second extension portion 95d extends from the end of the radially inner side of the second connection portion 95c toward the front side. The end of the front side of the second extension portion 95d is located at the rear side (+Z side) ahead of the end of the front side of the first extension portion 95b. The second extension portion 95d is connected to the contact portion 95e.

The contact portion 95e extends from the end of the front side (−Z side) of the second extension portion 95d toward the radially inner side. The contact portion 95e is preferably located at the end of the radially inner side of the circuit board connection terminal 95. The contact portion 95e preferably has a flat plate shape, and includes a contact surface 95f parallel or substantially parallel to the circuit board rear surface 71a at the front side.

The contact surface 95f contacts the circuit board rear surface 71a. For example, the contact portion 95e is preferably fixed to the circuit board 71 by soldering (not shown). As a result, the contact portion 95e is connected to the circuit board 71. That is, the circuit board connection terminal 95 is electrically connected to the circuit board 71 through soldering. Thus, the wiring member 92 is also electrically connected to the circuit board 71.

As illustrated in FIG. 3, the contact portions 95e of the plurality of wiring members 92 are provided on the circuit board rear surface 71a in a predetermined direction. In the present preferred embodiment, the contact portions 95e are preferably provided along the division-line direction (Y-axis direction).

The circuit board connection terminals 95 apply force to the circuit board 71 in the direction from the rear side (+Z side) to the front side (−Z side) through the contact portions 95e. That is, under the condition that the circuit board 71 is separated, the contact surface 95f at the contact portion 95e is disposed at the front side ahead of the circuit board rear surface 71a in the axial direction (Z-axis direction).

Under the condition that the circuit board connection terminal 95 is connected to the circuit board 71, for example, the circuit board connection terminal 95 is elastically deformed in the axial direction (Z-axis direction). As an example, the first extension portion 95b extends in the axial direction, resulting in increase of the axial thickness. The second extension portion 95d is reduced in size in the axial direction, resulting in reduction of the axial thickness of the second extension portion 95d.

As illustrated in FIG. 5, in the circumferential direction (θZ direction) of the center axis J, the position of the circuit board connection terminal 95 is preferably different from those of the coil connection portions 91a-91f.

As illustrated in FIG. 1, the front side O-ring 81 is disposed in the housing 21. The front side O-ring 81 is fixed to the O-ring holding portion 62e of the bus bar holder 61. The front side O-ring 81 contacts the inner surface of the housing 21 and the outer surface of the main body portion 62 over the circumference. That is, the front side O-ring 81 contacts the main body portion 62 and the housing 21 over the circumference. Stress generated from the inner surface of the bus bar assembly insertion portion 21a is loaded on the front side O-ring 81.

The rear side O-ring 82 is disposed in the cover 22. The rear side O-ring 82 is fitted into the groove portion 62f. The cover 22, to be described later, includes a cover front surface 22c at the front side (−Z side) of the cover portion 22b. The entire circumference of the rear side O-ring 82 contacts the cover front surface 22c, to be described later. Stress generated from the cover front surface 22c is loaded on the rear side O-ring 82.

In preferred embodiment, the front side O-ring 81 and the rear side O-ring 82 are preferably made of, for example, resin including silicon rubber or the like. In this case, the front side O-ring 81 and the rear side O-ring 82 are preferably manufactured by, for example, machining elongated silicon rubber having a round cross section in a ring shape. However, a configuration and a material of the front side O-ring 81 and the rear side O-ring 82 are not limited thereto.

The cover 22 is attached to the rear side (+Z side) of the housing 21. A material of the cover 22 is preferably, for example, metal. In more detail, as the material of the cover 22, for example, aluminum or an iron alloy such as SUS is used. As described above, the cover 22 includes a cylindrical portion 22a, a cover portion 22b, a cover front surface 22c, and a rear side flange portion 24.

The cylindrical portion 22a is opened toward the front side (−Z side). The cylindrical portion 22a encloses the bus bar assembly 60 from the radially outer side of the center axis J. In more detail, the cylindrical portion 22a encloses the end of the rear side (+Z side) of the main body portion 62 from the radially outer side of the center axis J. In other words, at least a portion of the end of the rear side (+Z side) of the main body portion 62 is disposed in the cylindrical portion 22a. The cylindrical portion 22a is connected to the end of the rear side (+Z side) of the bus bar assembly insertion portion 21a through the front side flange portion 23 and the rear side flange portion 24.

The cover portion 22b is connected to the end of the rear side (+Z side) of the cylindrical portion 22a. In this preferred embodiment, the cover portion 22b preferably has a plate shape. The cover portion 22b preferably includes the cover front surface 22c at the front side (−Z side). The cover portion 22b closes the opening 62a. That is, the cover portion 22b covers the rear side of the opening 62a. The cover front surface 22c contacts the entire circumference of the rear side O-ring 82. Therefore, the cover 22 indirectly contacts the main body rear surface 62c through the rear side O-ring 82 over a circumference of the opening 62a.

The rear side flange portion 24 extends from the end of the front side (−Z side) of the cylindrical portion 22a toward the radially outer side. At least a portion of the front side flange portion 23 and at least a portion of the rear side flange portion 24 are bonded to each other while overlapping with each other, such that the housing 21 is bonded to the cover 22.

For example, the external power supply is connected to the motor 10 through the connector portion 63. The bus bar 91 protrudes from the bottom surface of the power-supply opening 63a. The connected external power supply is electrically connected to the bus bar 91 and the wiring member 92. Therefore, the driving current is supplied from the external power supply to the coil 43 and the rotation sensor 72 through the bus bar 91 and the wiring member 92. The rotation sensor 72 detects the magnetic flux of the rotor magnet. The driving current supplied to the coil 43 is controlled depending on the rotating position of the rotor 30 calculated based on, for example, the detected magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 having the shaft 31 rotates. By doing so, the motor 10 obtains a rotational driving force.

The circuit board connection terminal 95 applies force to the circuit board 71 through the contact portion 95e in a direction from the rear side to the front side. Therefore, the circuit board connection terminal 95 is able to be strongly fixed to the circuit board 71. In addition, although there is a deviation in thickness (i.e., a deviation in the axial thickness) of the circuit board rear surface 71a, any lack of contact between the circuit board 71 and the circuit board connection terminal 95 is able to be significantly reduced or prevented.

The first circuit board support portions 67a and 67b are preferably located in the first region AR1. Therefore, the first circuit board support portions 67a and 67b support the circuit board 71 in contact locations between the circuit board 71 and the circuit board connection terminal 95 (i.e., in the vicinity of the contact portion 95e). Therefore, when impact is applied to the motor 10, the displacement of the circuit board 71 is able to be significantly reduced or prevented, in connection locations between the circuit board 71 and the contact portion 95e. Therefore, a connection portion between the circuit board 71 and the contact portion 95e, for example, the soldered portion, is able to be prevented from being damaged. As a result, an unstable electrical connection between the circuit board 71 and the circuit board connection terminal 95 is able to be prevented from occurring.

When viewed from the axial direction, the first circuit board support portions 67a and 67b are disposed at a position different from that of the contact portion 95e. Therefore, when the contact portion 95e is connected to the circuit board 71, heat caused by soldering, for example, is not easily applied to the first circuit board support portions 67a and 67b. Therefore, the above-mentioned operation prevents the first circuit board support portions 67a and 67b from being deformed by heat. As a result, the circuit board 71 is stably supported by the first circuit board support portions 67a and 67b.

The second circuit board support portion 67c is preferably located in the second region AR2. Accordingly, the circuit board 71 is supported in the first region AR1 and the second region AR2 on the basis of the center axis J by the first circuit board support portions 67a and 67b and the second circuit board support portion 67c. Therefore, according to the present preferred embodiment, the circuit board 71 is more stably supported.

The first circuit board support portions 67a and 67b are preferably located between the shaft 31 and the contact portion 95e in the radial direction. Therefore, the circuit board 71 is able to be easily inserted in the direction from the first circuit board support portions 67a and 67b and the contact portion 95e to the front side of the contact portion 95e. As a result, according to the present preferred embodiment, the circuit board 71 is easily attached.

If force is applied to the front side of the circuit board 71 through the contact portion 95e, a rotational moment could occur in the circuit board 71 using the first circuit board support portions 67a and 67b as a leverage point. As a result, there is a high possibility that a posture of the circuit board 71 becomes unstable.

In contrast, according to the present preferred embodiment, the second protrusion portions 69c and 69d are disposed in the second region AR2. The first circuit board support portions 67a and 67b are disposed between the shaft 31 and the contact portion 95e. Therefore, a rotational moment caused by the contact portion 95e is opposed by the second protrusion portions 69c and 69d due to a reverse rotational moment which occurs using the first circuit board support portions 67a and 67b as a leverage point. Therefore, according to the present preferred embodiment, the circuit board 71 is able to be stably supported.

The second protrusion portions 69c and 69d are preferably located on the circuit board rear surface 71a, such that the circuit board 71 is able to be more strongly fixed.

The circuit board connection terminal 95 preferably includes a first extension portion 95b extending toward the rear side. Therefore, since the first extension portion 95b is elastically deformed in the axial direction, force is able to be applied to the circuit board 71 in the direction from the rear side to the front side.

The circuit board connection terminal 95 preferably includes a second extension portion 95d extending toward the rear side. Therefore, the circuit board connection terminal 95 is able to be easily elastically deformed in the axial direction. Therefore, although inconsistencies in thickness of the circuit board 71 may occur due to manufacturing tolerances, an application of excessive force to the circuit board 71 in the direction from the rear side to the front side of the circuit board 71 is able to be prevented from occurring.

The first extension portion 95b extends to the rear side of the circuit board 71. The second connection portion 95c extends from the first extension portion 95b toward the radially inner side. The second extension portion 95d extends from the second connection portion 95c toward the front side. Therefore, the second extension portion 95d is connected to the contact portion 95e. Therefore, the circuit board connection terminal 95 is easily connected to the circuit board rear surface 71a.

The end of the front side of the second extension portion 95d is located at the rear side ahead of the end of the front side of the first extension portion 95b. Therefore, the circuit board is preferably located at the rear side ahead of a specific position in which the circuit board connection terminal 95 is fixed to the connection terminal holding portion 64. As a result, the circuit board 71 is able to be easily installed, and the circuit board connection terminal 95 is able to be easily connected to the circuit board 71. In addition, force is able to be easily applied to the circuit board 71 in the direction from the rear side to the front side by the circuit board connection terminal 95.

The circuit board connection terminal 95 preferably includes a plate-shaped contact portion 95e. The contact surface 95f contacts the circuit board rear surface 71a. Therefore, according to the present preferred embodiment, a contact region between the circuit board connection terminal 95 and the circuit board 71 is able to be enlarged in size, such that the circuit board connection terminal 95 and the circuit board 71 is able to be stably fixed.

The first circuit board support portions 67a and 67b extend along the arrangement direction of the contact portion 95e. That is, the first circuit board support portions 67a and 67b extend in the arrangement direction of a specific portion in which force generated from the circuit board connection terminal 95 is received through the contact portion 95e in the circuit board 71. Therefore, according to the present preferred embodiment, the circuit board 71 is able to be more stably supported by the first circuit board support portions 67a and 67b.

Two first circuit board support portions 67a and 67b are provided. A portion of the first circuit board support portion 67a are disposed at one side (−Y side) of the division-line direction of the plurality of contact portions 95e. A portion of the first circuit board support portion 67b are located at the other side (+Y side) of the division-line direction of the plurality of contact portions 95e. Therefore, by providing two first circuit board support portions 67a and 67b, the circuit board 71 is able to be stably supported. In addition, the first circuit board support portion 67a and the first circuit board support portion 67b may be spaced apart from each other in the division-line direction. Therefore, the installation space of the sensor magnet 73b is able to be increased in size. As a result, for example, although the sensor magnet 73b is easily increased in size (i.e., although the hall device is used as the rotation sensor 72), the sensor magnet 73b is able to be easily disposed.

When viewed from the axial direction, the first protrusion portions 69a and 69b preferably overlap with at least a portion of the coil connection portions 91a-91f in the circumferential direction. That is, the radial directional position of the deposition portion of the circuit board 71 may be further shifted to the outside as necessary. Therefore, the region of a main surface of the circuit board 71 may be increased in size. In addition, when the circuit board 71 is arranged, the first protrusion portions 69a and 69b is able to be easily inserted into the notch of the circuit board 71.

In addition, the following elements may also be applied to the present preferred embodiment.

The entirety of the first circuit board support portion 67a may also be disposed at one side (−Y side) of the plurality of contact portions 95e in the division-line direction. In addition, the entirety of the first circuit board support portion 67b may also be disposed at the other side (+Y side) of the plurality of contact portions 95e in the division-line direction.

Figure 6:
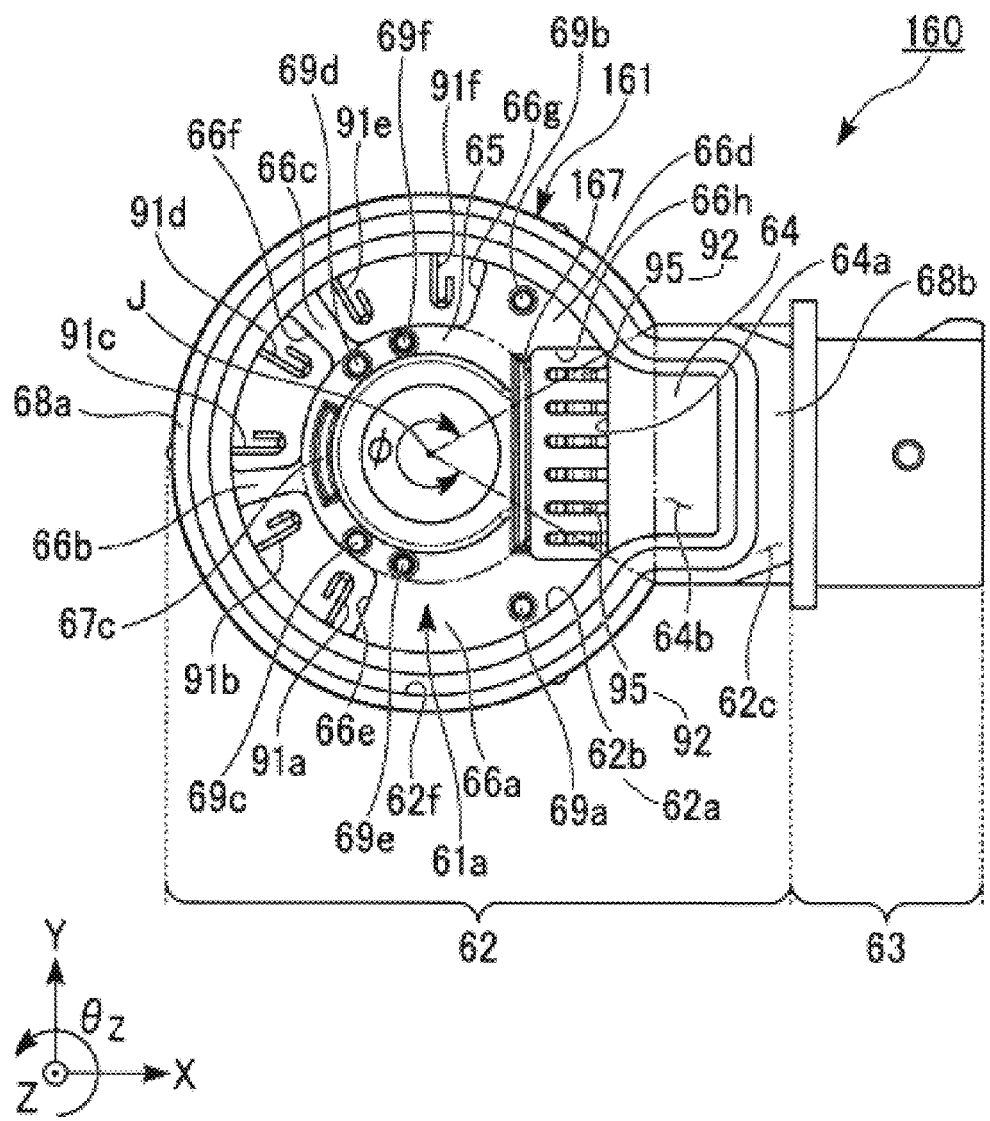
FIG. 6 is a plan view illustrating another example of a bus bar assembly according to a preferred embodiment of the present invention.

As illustrated in FIG. 6, only one first circuit board support portion may be used. Further, in the following description, the same components as those of the above-mentioned preferred embodiment are denoted with the same reference numbers and therefore the description of thereof may be omitted.

As illustrated in FIG. 6, the bus bar assembly 160 includes a bus bar holder 161. The bus bar holder 161 preferably includes a single first circuit board support portion 167, a single second circuit board support portion 67c, two first protrusion portions 69a and 69b, two second protrusion portions 69c and 69d, and two bus bar holder convex portions 69e and 69f.

The first circuit board support portion 167 extends in the division-line direction (Y-axis direction). As illustrated in FIGS. 3 and 5, the first circuit board support portion 167, for example, is provided in a specific shape defined when the first circuit board support portion 67a is connected to the first circuit board support portion 67b along the division-line direction. Other elements of the first circuit board support portion 167 are preferably identical to those of the first circuit board support portions 67a and 67b.

According to the above-mentioned structure, the circuit board 71 is able to be more stably supported. In addition, a magnetoresistive element that reduces the size of the sensor magnet 73b may be used as the rotation sensor 72. Therefore, resolution of the rotation sensor 72 is able to be increased.

In the protrusion direction (X-axis direction) of the connector portion 63, the first circuit board support portion 67a may also be disposed at a position different from that of the first circuit board support portion 67b.

Figure 7:
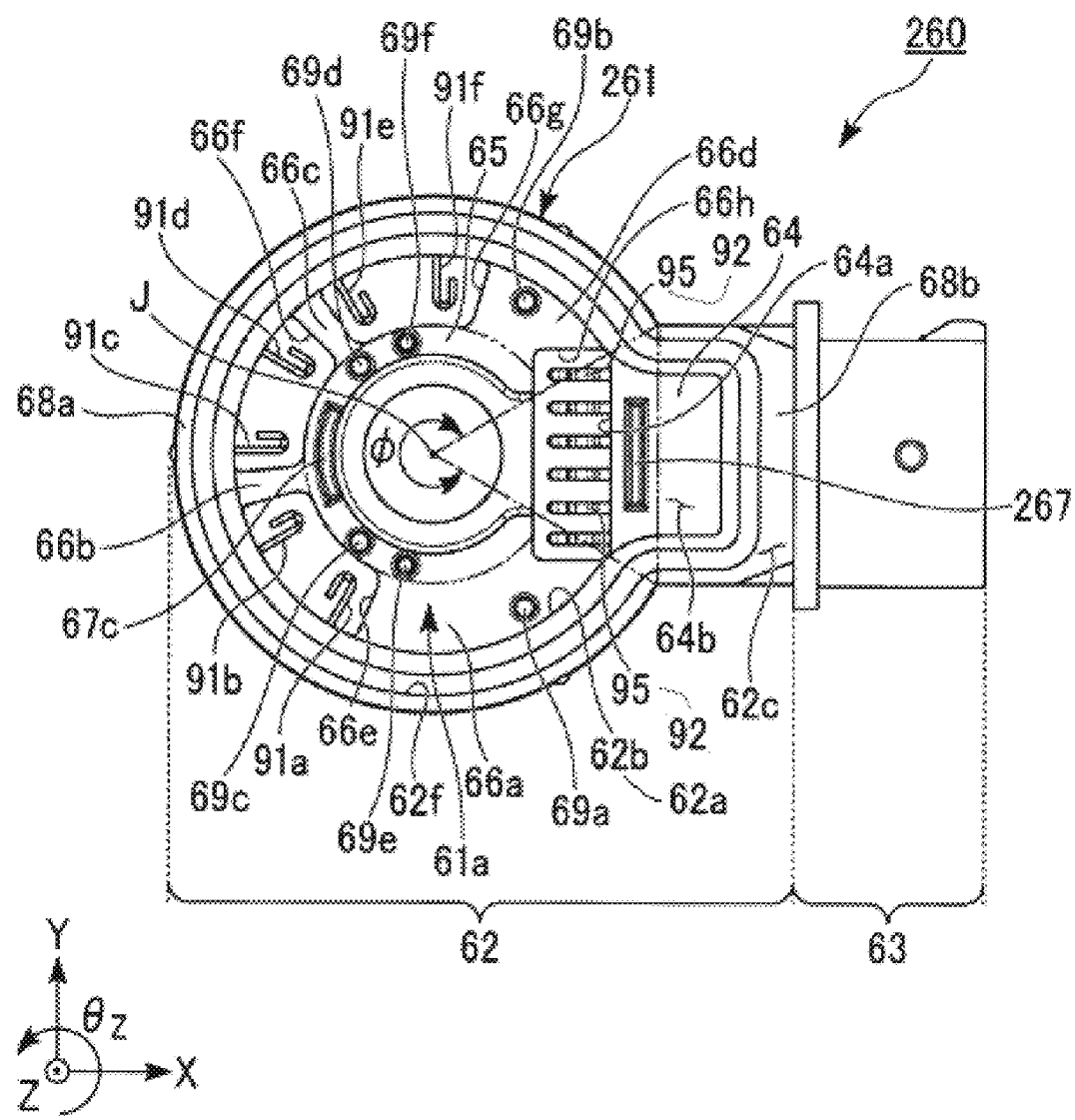
FIG. 7 is a plan view illustrating another example of a bus bar assembly according to a preferred embodiment of the present invention.

As illustrated in FIG. 7, the first circuit board support portion is disposed at the holding portion rear surface 64b of the connection terminal holding portion 64. For example, the first circuit board support portions 67a and 67b may also be disposed at any position of the first region AR1.

FIG. 7 is a plan view illustrating the bus bar assembly 260 according to another example of a preferred embodiment of the present invention. Further, in the following description, the same components as those of the above-mentioned preferred embodiment are denoted with the same reference numbers and therefore the description of thereof may be omitted.

As illustrated in FIG. 7, the bus bar assembly 260 includes a bus bar holder 261. The bus bar holder 261 preferably includes a single first circuit board support portion 267, a single second circuit board support portion 67c, two first protrusion portions 69a and 69b, two second protrusion portions 69c and 69d, and two bus bar holder convex portions 69e and 69f.

The first circuit board support portion 267 is disposed at the holding portion rear surface 64b. The first circuit board support portion 267 extends in the division-line direction (Y-axis direction). Other elements of the first circuit board support portion 267 are preferably identical to those of the first circuit board support portions 67a and 67b shown in FIGS. 3 and 5, and the like.

In FIG. 7, only one first circuit board support portion 267 is provided. However, in this construction, a plurality of first circuit board support portions may also be used.

Two or more second circuit board support portions 67c may also be used. The second circuit board support portion 67c may not be used.

Only one of the second protrusion portions 69c and 69d may be used or two second protrusion portions 69c and 69d may not be used. Only one of the first protrusion portions 69a and 69b may be used or two first protrusion portions 69a and 69b may not be used.

The second protrusion portions 69c and 69d may not be deposited on the circuit board 71. Likewise, the first protrusion portions 69a and 69b may not be deposited on the circuit board 71.

In the above-mentioned description, although the circuit board 71 is disposed at the rear side of the shaft 31, the present invention is not limited thereto. Although the shaft 31 is inserted into a through-hole provided to the circuit board 71, the shaft 31 may protrude toward the rear side of the circuit board 71.

Figure 8:
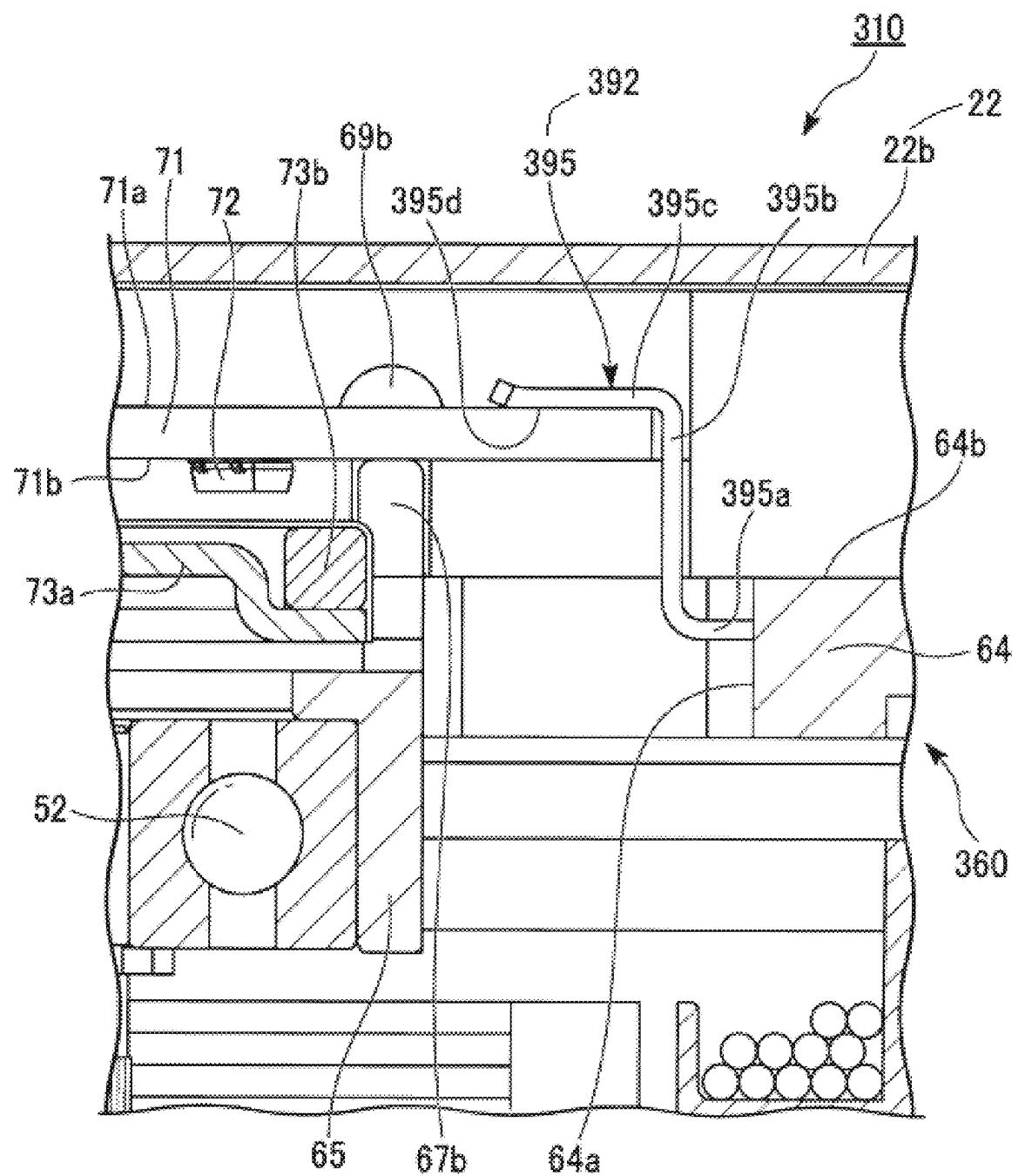
FIG. 8 is a partially enlarged cross-sectional view illustrating another example of a motor according to a preferred embodiment of the present invention.

In so far as force is applied to the circuit board 71 from the rear side to the front side, the structure of the circuit board connection terminal 95 is not limited. For example, the structure of FIG. 8 may also define a structure of the circuit board connection terminal 95. FIG. 8 is a partially cross-sectional view illustrating some elements of the motor 310 according to another example of a preferred embodiment of the present invention. In the following description, the same components as those of the above-mentioned preferred embodiment are denoted with the same reference numbers and therefore the description of thereof may be omitted.

As illustrated in FIG. 8, the motor 310 includes a bus bar assembly 360. The bus bar assembly 360 preferably includes a wiring member 392. The wiring member 392 includes a circuit board connection terminal 395. The circuit board connection terminal 395 preferably includes a first connection portion 395a, a first extension portion 395b, and a contact portion 395c. The circuit board connection terminal 395 is different from the circuit board connection terminal 95 in that only one connection portion and only one extension portion are provided.

The first connection portion 395a protrudes from the holding portion inner surface 64a toward the radially inner side. The first connection portion 395a is disposed at the radially outer side ahead of the circuit board 71. The first extension portion 395b extends from the first connection portion 395a toward the rear side (+Z side). In more detail, the first extension portion 395b extends from the end of the radially inner side of the first connection portion 395a toward the rear side.

The contact portion 395c extends from the end of the rear side (+Z side) of the first extension portion 395b toward the radially inner side. The contact portion 395c is disposed at the end of the radially inner side of the circuit board connection terminal 395. The contact portion 395c preferably has a plate shape, and includes a contact surface 395d parallel or substantially parallel to the circuit board rear surface 71a at the front side (−Z side). The contact surface 395d is preferably identical to the contact surface 95f shown in FIG. 2.

Other elements of the contact portion 395c are preferably identical to those of the contact portion 95e shown in FIG. 2. Other elements of the motor 310 are identical to those of the motor 10 shown in FIG. 1 and the like.

According to the structure shown in FIG. 8, the circuit board connection terminal 395 preferably includes only one connection portion and only one extension portion. Therefore, as compared to the shape of the circuit board connection terminal 95, the shape of the circuit board connection terminal 395 is simplified. Therefore, according to this structure, the circuit board connection terminal 395 is able to be easily manufactured.

Figure 9:
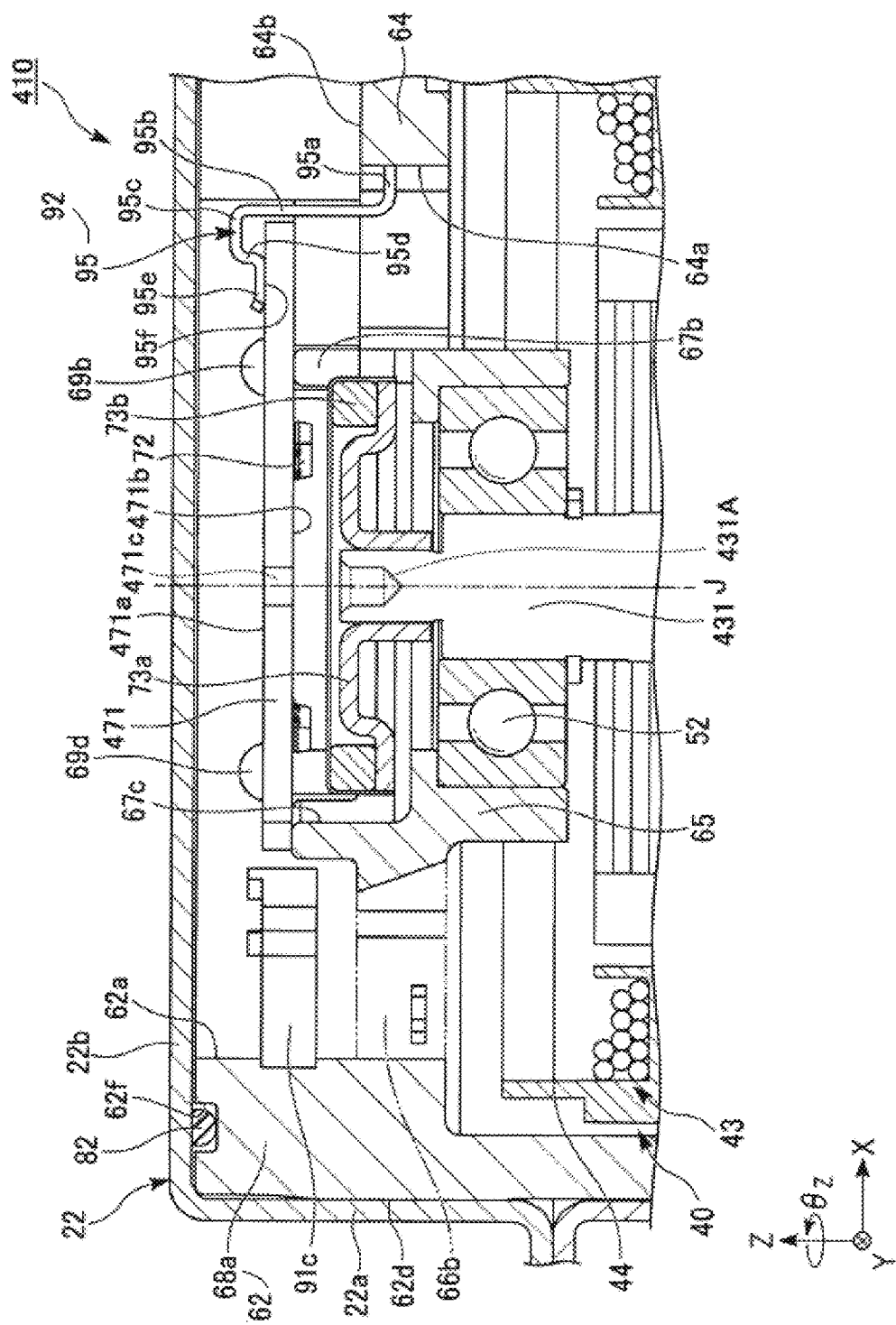
FIG. 9 is a partially enlarged cross-sectional view illustrating another example of a motor according to a preferred embodiment of the present invention.

The structure that increases the accuracy of positioning between the rotation sensor 72 and the sensor magnet 73b may also be disposed at the circuit board 71. FIG. 9 is a partially enlarged cross-sectional view illustrating the motor according to another example of a preferred embodiment of the present invention. Further, in the following description, the same components as those of the above-mentioned preferred embodiment are denoted with the same reference numbers and therefore the description of thereof may be omitted.

The motor 410 preferably includes a circuit board 471. The circuit board 471 includes a circuit board hole 471c. The circuit board hole 471c is disposed at the center of plural circuit sensors 72 in the circuit board 471.

The motor 410 includes a shaft 431. The shaft 431 includes a center hole 431A at the end of the rear side (+Z side). The center hole 431A is concaved from the end of the rear side (+Z side) of the shaft 431 toward the front side (−Z side).

Before the first protrusion portions 69a and 69b and the second protrusion portions 69c and 69d are deposited, there is a high possibility that the circuit board 471 easily move from a predetermined position. However, according to the above-mentioned structures of preferred embodiments of the present invention, the bus bar holder convex portions 69e and 69f preferably are inserted into a hole portion disposed at the circuit board 71, as shown in FIG. 3. Therefore, movement of the circuit board 471 is able to be significantly reduced or prevented. In addition, positioning alignment between the circuit board 471 and the shaft 431 becomes facilitated. As a result, the positioning accuracy of the rotation sensor 72 attached to the circuit board 471, the shaft 431, and the sensor magnet 73b rotationally disposed at the shaft 431 is able to be improved. According to the structure of FIG. 9, positioning between the circuit board 471 and the shaft 431 may be determined. As a result, the positioning accuracy between the rotation sensor 72 and the sensor magnet 73b is able to be improved. In more detail, according to the present preferred embodiment of FIG. 3, the position of the circuit board 71 is preferably determined by the bus bar holder 61. Therefore, the circuit board 71 includes a plurality of elements disposed between the sensor magnet 73b and the circuit board 71. Meanwhile, according to the present preferred embodiment of FIG. 9, the circuit board 471 is fixed to the shaft 431. Therefore, the circuit board 471 includes only the sensor magnet holding member 73a disposed between the circuit board 471 and the sensor magnet 73b. Therefore, the structure of the preferred embodiment shown in FIG. 9 is able to reduce to a greater degree the errors generated in the manufacturing process of the motor 10, resulting in increased positioning accuracy.

In the present preferred embodiment of FIG. 9, the inner diameter of the circuit board hole 471c is preferably identical or substantially identical to the inner diameter of the center hole 431A. A jig having both an inner diameter of the circuit board hole 471c and an outer diameter identical or substantially identical to an inner diameter of the center hole 431A is inserted into the circuit board hole 471c and the center hole 431A. As a result, the circuit board 471 and the shaft 431 may perform higher-accuracy positioning. Therefore, the position accuracy between the rotation sensor 72 and the sensor magnet 73b is improved, and the accuracy of position detection of the rotation sensor is improved. The center hole 431 is generally a center hole formed when a bar-shaped member is fabricated. Therefore, the shaft 431 need not be especially fabricated, and a conventional shaft structure can be used.

The structure that increases the accuracy of positioning between the rotation sensor 72 and the sensor magnet 73b is not limited thereto. In the above-mentioned structures of preferred embodiments of the present invention, the plurality of rotation sensors 72 (e.g., a hall sensor) may be provided with a circular or substantially circular shape on the circuit board. Therefore, the accuracy of positioning between the rotation sensor 72 and the sensor magnet 73b is able to be increased. For example, in the case where the rotation sensor 73b (e.g., MR sensor) is disposed at the center axis on the circuit board, the external appearance of the shaft may be used or the structure of using the bearing may also be used.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
a rotor including a shaft with a center on a center axis extending in one direction from a first side of the motor to a second side of the motor;
a stator enclosing the rotor and rotating the rotor about the center axis;
a cylindrical housing holding the stator;
a bus bar assembly;
a circuit board allowing a surface of the second side to cross the one direction; wherein
the bus bar assembly includes:
a wiring member electrically connecting to the circuit board; and
a bus bar holder holding the wiring member;
the bus bar holder includes:
a cylindrical main body portion;
a connector portion protruding from the main body portion toward a radially outer side of the center axis;
a bottom portion widening from an inner surface of the main body portion toward a radially inner side; and
a first circuit board support portion extending axially from the bottom portion, and supporting the circuit board axially;
the wiring member includes:
a circuit board connection terminal electrically connected to the circuit board;
the circuit board connection terminal includes a contact portion connected to the circuit board,
the first circuit board support portion is disposed at a region of the bottom portion to define a side at which the circuit board connection terminal is located when viewed from the one direction; and
the first circuit board support portion and the contact portion are disposed at different positions when viewed from the one direction.

2. The motor of claim 1, wherein
the bus bar holder includes a second circuit board support portion that extends axially from the bottom portion to support the circuit board; and
the second circuit board support portion is disposed at a region of the bottom portion to define a side opposite to a specific side at which the circuit board connection terminal is located when viewed from the one direction.

3. The motor of claim 1, wherein the first circuit board support portion is disposed between the shaft and the contact portion in a radial direction.

4. The motor of claim 3, wherein
the bus bar holder includes a third circuit board support portion that supports the circuit board axially; and
the third circuit board support portion is disposed at a region of the bottom portion to define a side opposite to a specific side at which the circuit board connection terminal is located when viewed from the one direction.

5. The motor of claim 1, wherein the circuit board connection terminal includes:
a first connection portion extending from the connector portion toward the radially inner side; and
a first extension portion extending from the first connection portion toward the second side.

6. The motor of claim 5, wherein the circuit board connection terminal includes:
a second connection portion extending from the first extension portion in the radial direction; and
a second extension portion extending from the second connection portion in the one direction.

7. The motor of claim 6, wherein
the first extension portion extends to the second side of the circuit board;
the second connection portion extends from the first extension portion toward the radially inner side; and
the second extension portion extends from the second connection portion toward the first side, and is connected to the contact portion.

8. The motor of claim 7, wherein an end of the first side of the second extension portion is located at the second side ahead of an end of the first side of the first extension portion.

9. The motor of claim 1, wherein
the bus bar assembly includes a plurality of the wiring members;
the contact portion of the circuit board connection terminal in the plurality of wiring members is provided in a predetermined direction within a surface of the circuit board; and
the first circuit board support portion extends in the predetermined direction.

10. The motor of claim 1, wherein
the bus bar assembly includes the plurality of wiring members;
the contact portion of the circuit board connection terminal in the plurality of wiring members is provided in a predetermined direction within a surface of the circuit board;
the bus bar holder includes two second circuit board support portions;
at least a portion of one first circuit board support portion is located at one side of the plurality of contact portions in the predetermined direction; and
at least a portion of the other first circuit board support portion is located at the other side of the plurality of contact portions in the predetermined direction.

11. The motor of claim 1, wherein the wiring member includes an external power-supply connection terminal provided in the connector portion,
at least one other portion of the wiring member is located closer to the second side of the motor in the one direction than the external power-supply connection terminal.

12. Motor of claim 11, wherein at least a portion of the circuit board connection terminal is located closer to the second side of the motor in the one direction than the external power-supply connection terminal.

* * * * *